Oct. 12, 1937.  E. HOFFMANN  2,095,549
FOLDABLE SPADE AND HOE
Filed Nov. 30, 1935
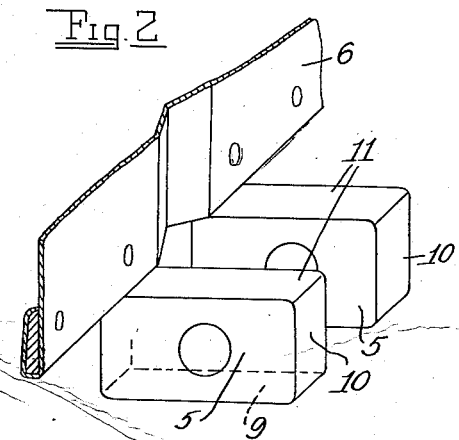
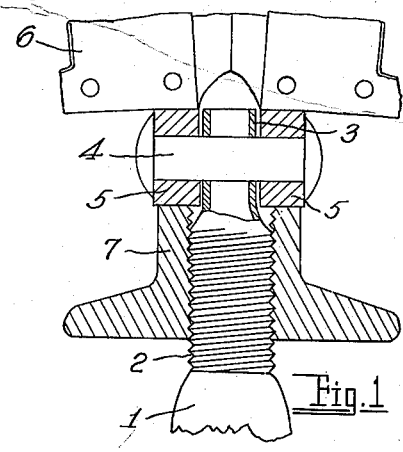
Inventor
Emmerich Hoffmann
by
Atty Patented Oct. 12, 1937

2,095,549

UNITED STATES PATENT OFFICE 2,095,549

FOLDABLE SPADE AND HOE

Emmerich Hoffmann, Budapest, Hungary

Application November 30, 1935, Serial No. 52,333
In Hungary August 1, 1935

2 Claims. (Cl. 306—18)

My invention relates to soil working implements and more especially to a foldable spade adapted to be used also as a hoe.

Foldable spades of different kinds have already been suggested in which means are provided for adjusting the spade proper in different positions relative to its handle, either in alignment to the handle or substantially at right angles thereto. Most of the implements of this kind hitherto on the market have proved of little value. It is an object of my invention to provide a device of the kind here in view, which is particularly suitable for rough use and, while being readily handled and adjusted to at least three different positions, combines great strength with great durability and extraordinary simplicity of design.

In the drawing affixed to this specification and forming part thereof a foldable spade embodying my invention is illustrated diagrammatically by way of example. In the drawing Fig. 1 is a front elevation, partly in axial section, and Fig. 2 is a side elevation.

Referring to the drawing, 1 is a handle threaded at 2; its flattened end 3 is traversed by a hinge pin 4, the ends of which extend through eyes 5 fixed to the blade 6. 7 is a nut displaceable on the threading of the handle. 9, 10, and 11 are cam faces extending at right angles to each other, which are formed on the eyes 5. The nut 7 can be screwed into direct contact with either one of these cam faces and will then hold the blade either in the operative position, in which it is aligned with the handle for use as a spade, or in the position at right angles to the handle, in which the tool is fit for use as a hoe, or in the folded-down position.

In view of the extreme simplicity of construction of this tool and the fact that the surfaces of contact between the end of the nut and the cam faces are very large, the nut will be held in its operative position by strong friction and is not likely to become loosened during the use of the tool.

Obviously a locking nut might be provided on the handle, but as a rule such locking nut may be dispensed with.

I wish it to be understood that I do not desire to be limited to the exact details of construction shown and described for obvious modifications will occur to a person skilled in the art.

I claim:—

1. In a foldable spade in combination, a threaded handle, a hinge pin arranged on and extending transversely to said handle, a blade and eyes fixed to said blade, said eyes embracing said pin and being formed circumferentially with at least two angularly spaced cam faces, and a nut on said handle screwable into direct engagement with either one of said cam faces.

2. A combination foldable spade and hoe adapted to be nested in a compact arrangement when not in use, comprising in combination, a handle having a threaded portion, a hinge pin arranged on and extending transversely to said handle, a blade, and eyes fixed to said blade and embracing said pin, said eyes comprising three angularly spaced faces, and a nut adapted to be moved along said threaded portion into engagement with any one of said faces, said nut engaging one of said faces in the nested position of said spade where said blade folds back against said handle, while engaging either one of the other two faces in either operative position of said spade.

EMMERICH HOFFMANN.